US008863478B2

(12) United States Patent
Guerri et al.

(10) Patent No.: US 8,863,478 B2
(45) Date of Patent: Oct. 21, 2014

(54) ELECTRONIC COUNTING OF SEALING CYCLES OF AN ULTRASONIC SEALING DEVICE IN A PACKAGING MACHINE

(75) Inventors: Rossano Guerri, Bibbiano (IT); Antonio Melandri, Rubiera (IT); Angelo Boni, Reggio Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 191 days.

(21) Appl. No.: 13/318,274

(22) PCT Filed: May 26, 2010

(86) PCT No.: PCT/EP2010/057280
§ 371 (c)(1),
(2), (4) Date: Oct. 31, 2011

(87) PCT Pub. No.: WO2010/136505
PCT Pub. Date: Dec. 2, 2010

(65) Prior Publication Data
US 2012/0047847 A1 Mar. 1, 2012

(30) Foreign Application Priority Data
May 29, 2009 (EP) .................................. 09161595

(51) Int. Cl.
| | |
|---|---|
| B65B 7/00 | (2006.01) |
| B65B 9/20 | (2012.01) |
| B65B 51/22 | (2006.01) |
| B65B 57/00 | (2006.01) |
| B29C 65/08 | (2006.01) |
| B29L 9/00 | (2006.01) |
| B29C 65/00 | (2006.01) |
| B29K 23/00 | (2006.01) |
| B29K 711/12 | (2006.01) |

(52) U.S. Cl.
CPC ............... *B65B 9/20* (2013.01); *B29L 2009/00* (2013.01); *B29C 66/849* (2013.01); *B29K 2023/12* (2013.01); *B29K 2023/086* (2013.01); *B29K 2711/123* (2013.01); *B65B 51/225* (2013.01); *B65B 57/00* (2013.01); *B29C 66/90* (2013.01); *B29C 65/08* (2013.01); *B29K 2995/0069* (2013.01)
USPC ........................................... 53/373.7; 53/477

(58) Field of Classification Search
USPC .................... 53/75, 52, 373.7, 477, 370.7; 377/118–126
See application file for complete search history.

(56) References Cited

U.S. PATENT DOCUMENTS

| | | | |
|---|---|---|---|
| 4,353,123 A | 10/1982 | Rost et al. | |
| 4,592,236 A * | 6/1986 | Battagin et al. ................. | 73/602 |

(Continued)

FOREIGN PATENT DOCUMENTS

| | | |
|---|---|---|
| EP | 0 034 322 A2 | 8/1981 |
| EP | 0 615 907 A1 | 9/1994 |

(Continued)

OTHER PUBLICATIONS
International Search Report (PCT/ISA/210) issued on Aug. 12, 2010, by European Patent Office as the International Searching Authority for International Application No. PCT/EP2010/057280.

(Continued)

*Primary Examiner* — Hemant M Desai
(74) *Attorney, Agent, or Firm* — Buchanan Ingersoll & Rooney PC

(57) ABSTRACT

Packaging Machine operable to produce sealed packages made of heat-seal sheet packaging material and containing a food product, and comprising an ultrasonic sealing device including an electrical power signal source operable to generate an electrical power signal; an ultrasonic transducer electrically coupled to the electrical power signal source to receive the electrical power signal and responsively heat seal the sheet packaging material; and an electronic counter operable to count the ultrasonic sealing cycles of the ultrasonic sealing device.

18 Claims, 3 Drawing Sheets

(56) References Cited

U.S. PATENT DOCUMENTS

| | | | |
|---|---|---|---|
| 4,689,612 A * | 8/1987 | Schaal et al. | 235/375 |
| 4,696,425 A | 9/1987 | Landes | |
| 4,746,051 A * | 5/1988 | Peter | 228/102 |
| 5,321,230 A * | 6/1994 | Shanklin et al. | 219/492 |
| 5,546,733 A | 8/1996 | Paltrinieri | |
| 5,571,539 A * | 11/1996 | Starkey | 425/135 |
| 5,605,026 A * | 2/1997 | Schott et al. | 53/373.7 |
| 5,706,627 A | 1/1998 | Kirka et al. | |
| 5,729,180 A * | 3/1998 | Brown | 331/17 |
| 6,153,964 A | 11/2000 | Olsson et al. | |
| 6,320,927 B1 * | 11/2001 | Endo et al. | 377/26 |
| 6,732,496 B1 * | 5/2004 | Wessman et al. | 53/479 |
| 7,128,548 B2 * | 10/2006 | Manner | 425/135 |
| 7,204,123 B2 * | 4/2007 | McMahan et al. | 73/1.37 |
| 8,156,984 B2 * | 4/2012 | Wieduwilt et al. | 156/378 |
| 2002/0189206 A1 * | 12/2002 | Capodieci | 53/450 |
| 2008/0236105 A1 | 10/2008 | Brormann et al. | |
| 2012/0046765 A1 * | 2/2012 | Nikolic et al. | 700/90 |

FOREIGN PATENT DOCUMENTS

| | | | |
|---|---|---|---|
| GB | 1 107 015 A | 3/1968 | |
| GB | 2 012 673 A | 8/1979 | |
| GB | 2 071 004 A | 9/1981 | |
| JP | H04-178300 A | 6/1992 | |
| JP | H05-16929 A | 1/1993 | |
| JP | H08-40424 A | 2/1996 | |
| JP | H08-282604 A | 10/1996 | |
| JP | 2002-193224 A | 7/2002 | |
| JP | 2003-237712 A | 8/2003 | |
| RU | 2121911 C1 | 11/1998 | |
| RU | 2276014 C1 | 5/2006 | |
| WO | WO79/01023 A1 * | 11/1979 | B65B 57/16 |
| WO | WO 2008/125598 A1 | 10/2008 | |

OTHER PUBLICATIONS

Written Opinion (PCT/ISA/237) issued on Aug. 12, 2010, by European Patent Office as the International Searching Authority for International Application No. PCT/EP2010/057280.

* cited by examiner

ELECTRONIC COUNTING OF SEALING CYCLES OF AN ULTRASONIC SEALING DEVICE IN A PACKAGING MACHINE

This patent application is a U.S. National Phase of International Patent Application No. PCT/EP2010/057280, filed 26 May 2010, which claims priority to European Patent Office 09161595.5, filed 29 May 2009, the disclosures of which are incorporated herein by reference in their entirety.

TECHNICAL FIELD

The present invention relates in general to pourable food product packaging by transversely sealing a sheet packaging material tube filled continuously with the pourable food product. More specifically, the present invention relates to an electronic counter operable to count the ultrasonic sealing cycles of an ultrasonic sealing device in a Packaging Machine operable to produce sealed packages containing a food product.

BACKGROUND ART

As is known, many pourable food products, such as fruit or vegetable juice, pasteurized or UHT (ultra-high-temperature treated) milk, wine, etc., are sold in packages made of sterilized packaging material.

A typical example of this type of package is the parallelepiped-shaped package for pourable food products known as Tetra Brik Aseptic®, which is made by folding and sealing laminated strip packaging material.

The packaging material has a multilayer sheet structure substantially comprising one or more stiffening and strengthening base layers typically made of a fibrous material, e.g. paper, or mineral-filled polypropylene material, covered on both sides with a number of heat-seal plastic material layers, e.g. polyethylene film. In the case of aseptic packages for long-storage products, such as UHT milk, the packaging material also comprises a gas- and light-barrier material layer, e.g. aluminium foil or ethyl vinyl alcohol (EVOH) film, which is superimposed on a heat-seal plastic material layer, and is in turn covered with another heat-seal plastic material layer forming the inner face of the package eventually contacting the food product.

Packages of this sort are produced on fully automatic Packaging Machines 1, also known as Filling Machines, of the type shown in FIG. 1, wherein a continuous vertical tube 2 is formed from the web-fed packaging material 3, which is sterilized by applying a chemical sterilizing agent such as a hydrogen peroxide solution, which, once sterilization is completed, is removed, e.g. evaporated by heating, from the surfaces of the packaging material. The web-fed packaging material 3 is maintained in a closed, sterile environment, and is folded and sealed longitudinally to form the vertical tube 2.

The vertical tube 2 is then filled downwards with the sterilized or sterile-processed pourable food product by means of a filling pipe 4 extending inside the tube 2 and equipped with a flow-regulating solenoid valve 5, and is fed by known devices along a vertical path to a forming station 6, where it is gripped along equally spaced cross sections by a jaw system including two or more pairs of jaws, which act cyclically and successively on the tube 2, and seal the packaging material of the tube 2 to form a continuous strip of pillow packs 7 connected to one another by transverse sealing strips. Pillow packs 7 are then separated from one another by cutting the relative sealing strips, and are conveyed to a final folding station (not shown) where they are folded mechanically into the finished, e.g. substantially parallelepiped-shaped, packages 8.

In the case of aseptic packages with an aluminium layer as the barrier material, the tube 2 is normally sealed longitudinally and transversely by an induction sealing device, which induces parasitic electric current in the aluminium layer to locally melt the heat-seal plastic material. More specifically, for transverse sealing, one of the jaws in each pair comprises a main body made of non-conducting material, and an inductor housed in a front seat in the main body; and the other jaw is fitted with pressure pads made of elastically yielding material, such as rubber.

When the relative pair of jaws grips the tube 2, the inductor is powered to seal a cross section of the tube 2 by heat sealing the plastic cover material. When powered, the inductor generates a pulsating magnetic field, which in turn produces parasitic electric current in the aluminium sheet in the packaging material from which the vertical tube is made, thus locally melting the heat-seal plastic cover material.

In the case of packages without an aluminium layer or other electrically conductive materials, the tube 2 is normally transversely sealed by a hot plate which locally heats the packaging material from the outside to the inside. More specifically, one of the jaws in each pair is equipped with the hot plate, and the other jaw is fitted with one or more pressure pads made of elastically yielding material. In this type of sealing, known as hot plate sealing, a relatively long time is needed for the hot plate to locally melt the heat-seal plastic cover material, which results in a low package production rate.

In order to improve the performance of the Filling Machines, ultrasonic sealing devices of the type disclosed for example in EP-B-615907 in the name of the present Applicant have been introduced, which essentially comprise an anvil and an ultrasonic transducer, also known as sonotrode, operable to convert electrical energy into ultrasonic mechanical vibratory energy, which are mounted on respective jaws in each pair and cooperate in heating the packaging material by means of ultrasonic vibrations.

DISCLOSURE OF THE INVENTION

Components of ultrasonic sealing devices are typically quite expensive and hence warranty claims may occur if the lifetime thereof is shorter than warranted. Generally, a product warranty is contingent upon proper and regular use of the warranted product, and hence in order to meet both the manufacturers' and the purchasers' need for fair warranty terms and conditions and for fair settlements of warranty disputes, the need is felt by both parties for a solution that allows the operation of the ultrasonic sealing devices to be directly and continuously monitored over time and certified.

However, the operation of ultrasonic sealing devices has proven to be not easily directly monitorable because some components of ultrasonic sealing devices may be used in different Filling Machines at different times. Similarly, indirect monitoring of ultrasonic sealing devices based on production-related data has proven to be unreliable or even unfeasible when this data is not available.

The objective of the present invention is to provide a solution that allows the operation of ultrasonic sealing devices to be continuously, easily, reliably and efficiently monitored over time.

This objective is achieved by the present invention in that it relates to a Packaging Machine and an ultrasonic sealing device, as defined in the appended claims.

The operation of the ultrasonic sealing device is monitored over time by an electronic counter associated with the ultrasonic transducer of the ultrasonic sealing device to count the ultrasonic sealing cycles of the ultrasonic sealing device in the Packaging Machine. The electronic counter may be arranged either in the ultrasonic transducer housing or in a separate housing and electrically connected to the ultrasonic transducer.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF THE INVENTION

The following description is presented to enable a person skilled in the art to make and use the invention. Various modifications to the embodiments will be readily apparent to those skilled in the art, without departing from the scope of the claimed invention. Thus, the present invention is not intended to be limited to the embodiments shown, but is to be accorded the widest scope consistent with the principles and features disclosed herein and defined in the appended claims.

Figure 1:
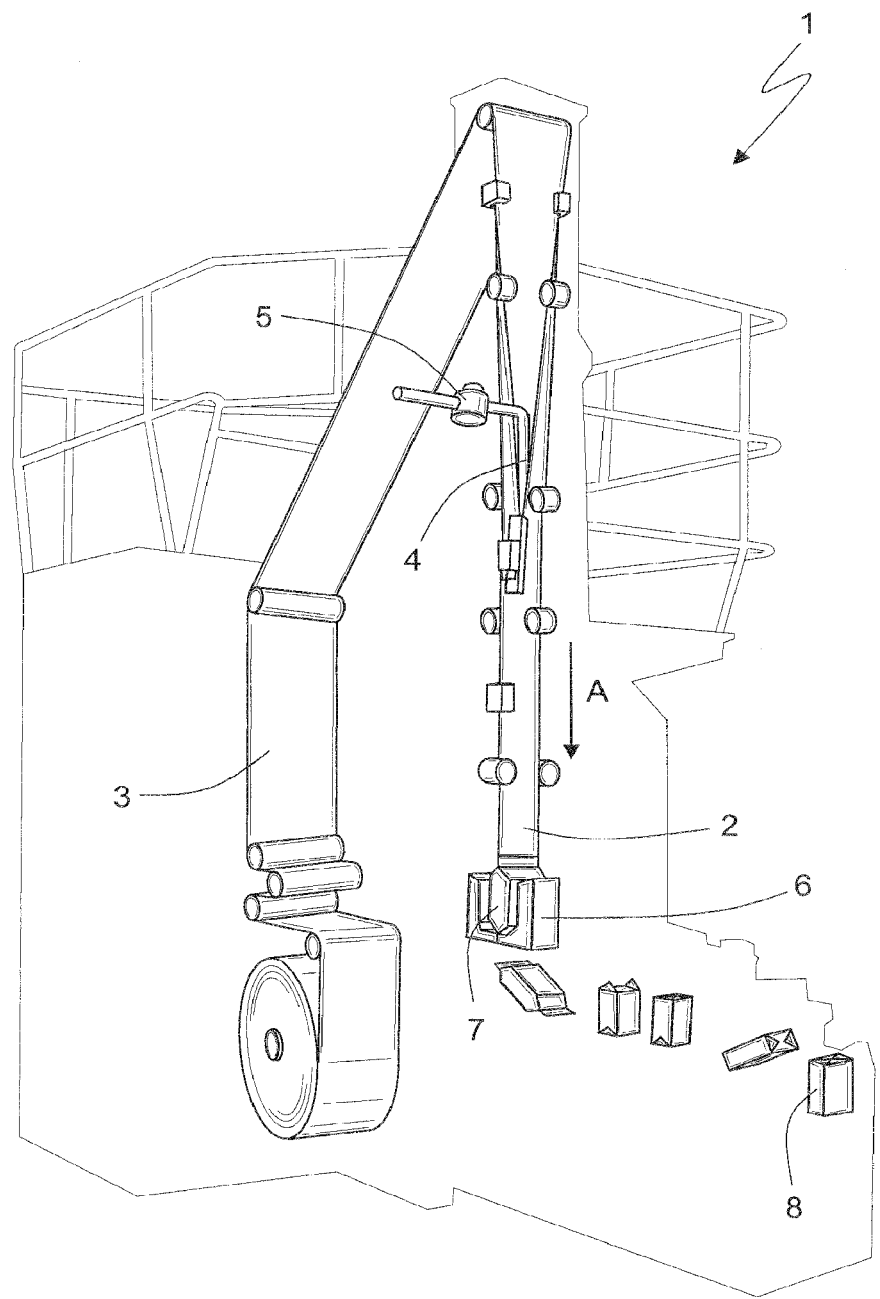
FIG. 1 shows a perspective view, with omitted parts removed, of a Packaging Machine operable to produce sealed packages containing food products from a tube of packaging material.
Figure 2:
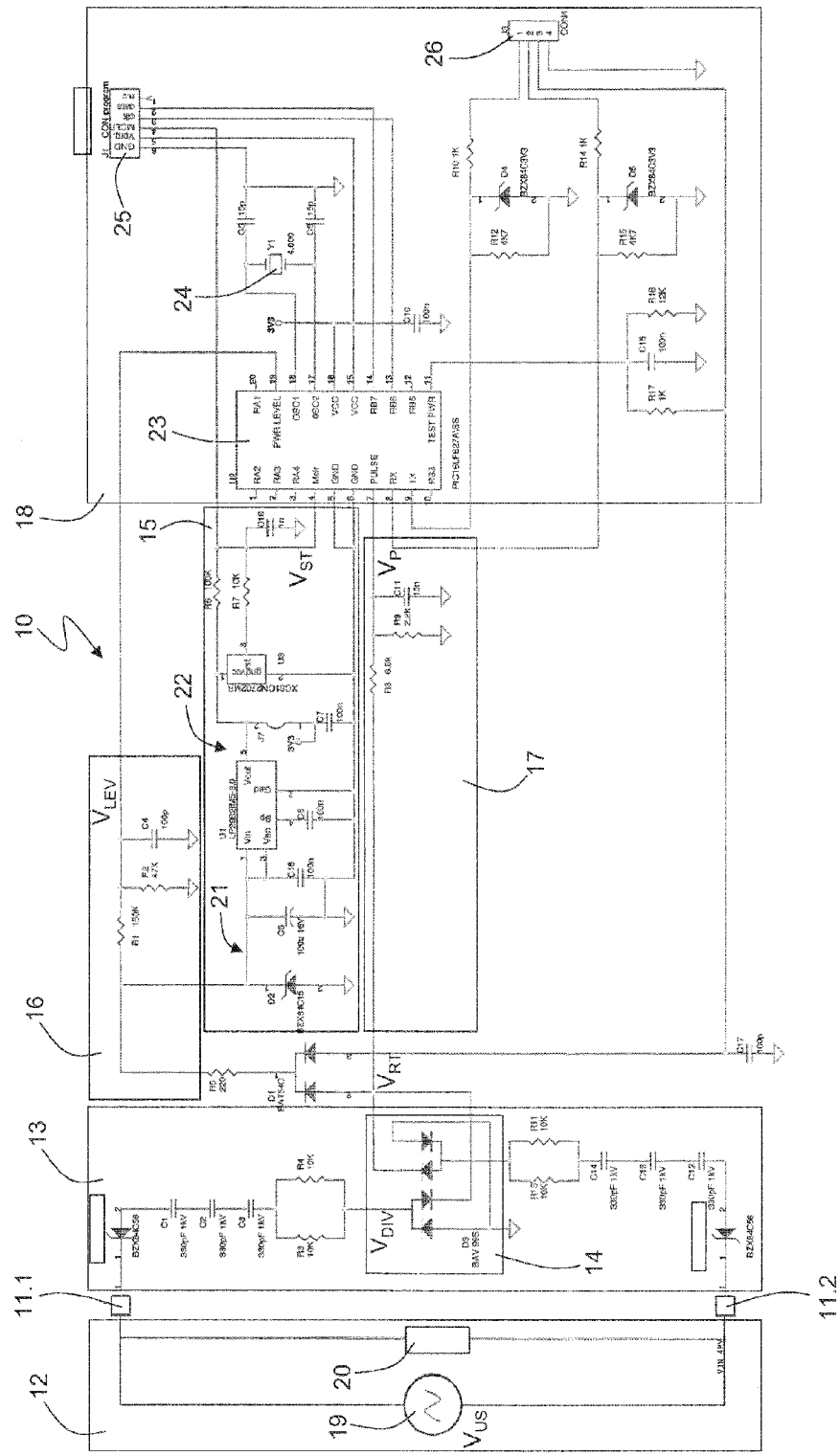
FIG. 2 shows an electric diagram of an electronic counter operable to count the number of sealing cycles of an ultrasonic sealing device in a Packaging Machine.

FIG. 2 shows an electric diagram of an electronic counter provided in an ultrasonic sealing device in the Filling Machine shown in FIG. 1 to count the sealing cycles or operations performed by the ultrasonic sealing device.

The electronic counter, referenced by 10, includes:
a couple of input terminals 11.1, 11.2 intended to be electrically connected to an ultrasonic sealing device 12, the sealing operations of which, hereinafter referred to as ultrasonic sealing cycles, are to be counted;
a balanced capacitive voltage divider 13 connected to the input terminals 11.1, 11.2;
a voltage bridge rectifier 14 connected to the balanced capacitive voltage divider 13;
a stabilized electrical power supply 15, a voltage meter 16 and a counting pulse generator 17 connected to the voltage bridge rectifier 14; and
a microprocessor-based counter 18 connected to the stabilized electrical power supply 15, the voltage meter 16 and the counting pulse generator 17 and configured to count both the ultrasonic sealing cycles of the ultrasonic sealing device 12 and the production cycles of the Filling Machine 1.

More in detail, the ultrasonic sealing device 12 is shown schematically in FIG. 2 limited to only those parts thereof that are necessary to understand the operation of the electronic counter 10 according to the present invention. The ultrasonic sealing device 12 includes an electrical power source 19 operable to supply a pulsed AC power signal $V_{US}$, and an ultrasonic transducer or sonotrode 20 electrically coupled to the electrical power source 19 to receive and responsively convert the pulsed AC power signal $V_{US}$ into ultrasonic mechanical vibrations to heat seal the sheet packaging material 3.

The electronic counter 10 may be arranged either in the ultrasonic transducer housing or in a separate housing and electrically connected to the ultrasonic transducer 20. Serial numbers of both the electronic counter 10 and the ultrasonic transducer 20 are indissolubly associated with each other during assembly and recorded in an appropriate paper or electronic register kept by the ultrasonic transducer manufacturer.

Figure 3:
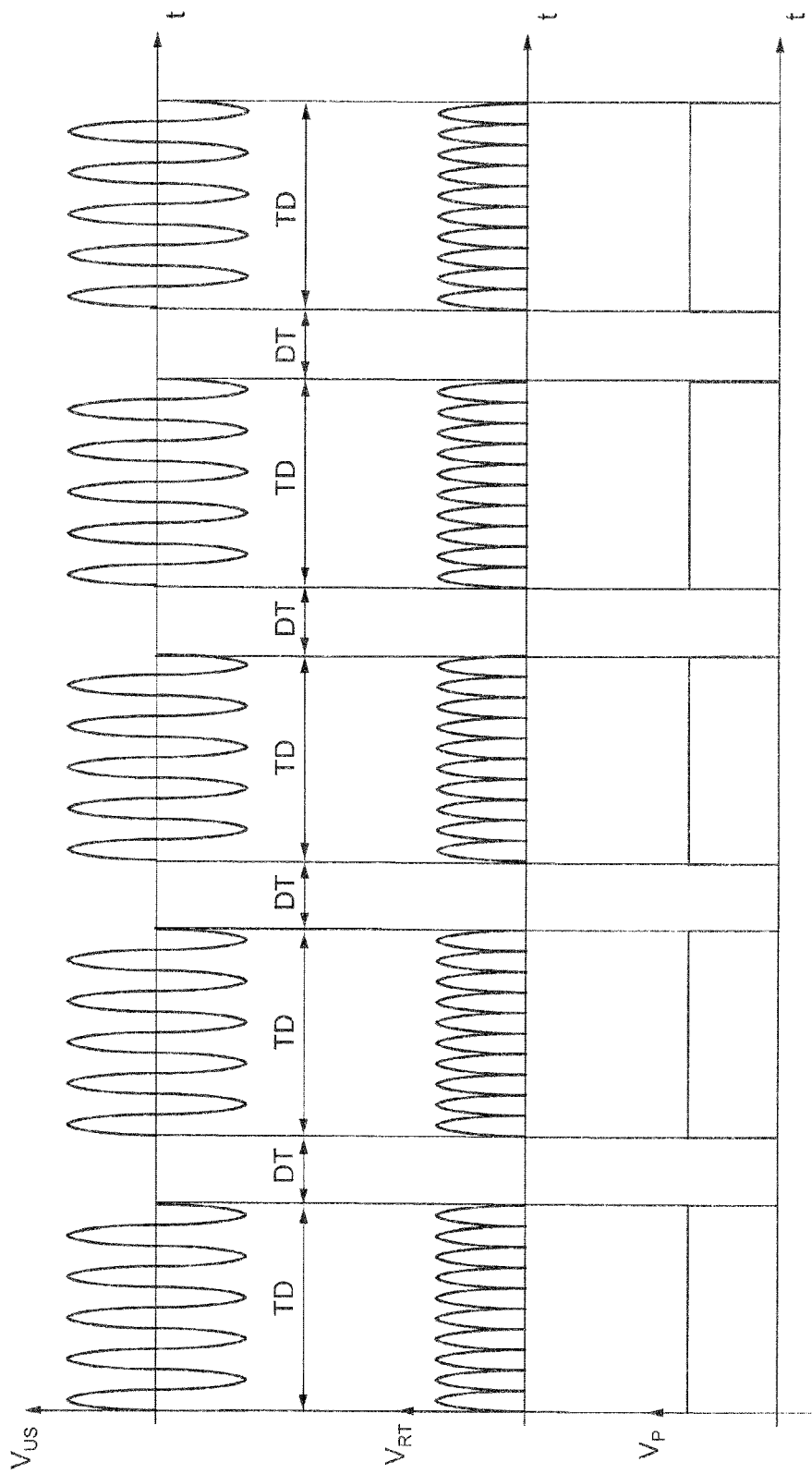
FIG. 3 shows time charts of electric signals in the electronic counter of FIG. 2.

As shown in FIG. 3, the pulsed AC power signal $V_{US}$ is a train of AC voltage signals spaced apart by one and the same electrical dwell time DT, the value of which depends on the capacity (packages/hour) of the Filling Machine 1 and may be e.g. 0.7 sec. Each AC voltage signal is a sine wave voltage signal with a frequency of few tens of kHz, an RMS (Root Mean Square) amplitude of about a thousand of volts, and a time duration which varies depending on the operation to be performed. In the specific example described, each sine wave voltage signal has a time duration TD which may be either not lower than 70-80 msec, typically 100 ms, during ultrasonic sealing, or of about 50 msec during calibration of the ultrasonic sealing device 12. In fact, typically every 10 ultrasonic sealing cycles, a calibration cycle is performed to determine the loadless power absorption of the ultrasonic transducer 20 so as to compensate for wear-related drifts thereof.

The balanced capacitive voltage divider 13 is connected to the input terminals 11.1, 11.2 to receive the pulsed AC power signal $V_{US}$ and is designed to output a divided pulsed AC power signal $V_{DIV}$ having the same time and frequency characteristics as the pulsed AC power signal $V_{US}$, but a reduced amplitude of the AC voltage signals. In the specific example shown in FIG. 2, the balanced capacitive voltage divider 13 includes an even number of capacitors, in the number of six in the example shown in FIG. 2, which are series-connected between the input terminals 11.1, 11.2, and wherein the intermediate node of series-connected capacitors defines the output of the balanced capacitive voltage divider 13.

The voltage bridge rectifier 14 is connected to the output of the balanced capacitive voltage divider 13 to receive the divided pulsed AC power signal $V_{DIV}$ and is operable to full-wave rectify the divided pulsed AC power signal $V_{DIV}$ and output a pulsed full-wave rectified power signal $V_{RT}$. As shown in FIG. 3, the pulsed full-wave rectified power signal $V_{RT}$ is a train of full-wave rectified voltage signals spaced apart by the aforementioned electrical dwell time DT. Each full-wave rectified voltage signal is a positive or negative half-sine wave voltage signal with a time duration TD equal to that of an AC voltage signal in the pulsed AC power signal $V_{US}$, a frequency twice that of an AC voltage signal and a positive or negative amplitude half the peak-to-peak amplitude of an AC voltage signal. Moreover, from an operational point of view, each full-wave rectified voltage signal represents an ultrasonic sealing pulse supplied to the ultrasonic transducer 20 of the ultrasonic sealing device 12, and results in an ultrasonic sealing cycle of the ultrasonic sealing device 12.

The stabilized electrical power supply 15 is connected to the output of the voltage bridge rectifier to receive the pulsed full-wave rectified power signal $V_{RT}$ and is designed to output a stabilized supply voltage $V_{ST}$, for example of 3.3 or 5 volts, for the microprocessor-based counting circuit 18. In particular, the stabilized electrical power supply 15 comprises an input stage 21 and a cascade-connected electrical power supply stage 22, wherein the input stage 21 includes an capacitor and a parallel-connected Zener diode which are provided to receive the pulsed full-wave rectified power signal $V_{RT}$ and to output an electrical voltage for the cascade-connected electrical power supply stage 20. More in detail, the capacitor has such a high capacitance, in the example shown in FIG. 2 of about 100 µF, to maintain the electrical voltage across thereto almost stable between successive ultrasonic sealing cycles, which electrical voltage in turn represents the electrical voltage supplied to the cascade-connected electrical power supply stage 20 and would tend to drop between successive ultrasonic sealing cycles due to the power consumption of the microcontroller-based counting stage 18. The Zener diode is instead provided to limit the maximum electrical voltage supplied to the cascade-connected electrical power supply stage 20 and protect it against higher voltage.

The voltage meter 16 essentially includes an RC filter which is connected to the input stage 21 of the stabilized electrical power supply 15 to receive the same electrical voltage as that supplied to the cascade-connected electrical power supply stage 20 of the stabilized electrical power supply 15, and is designed to output a voltage level signal $V_{LEV}$ indicative of the amplitude of the electrical voltage across the capacitor of the input stage 21 of the stabilized power supply 15.

The counting pulse generator 17 essentially includes an RC filter connected to the output of the voltage bridge rectifier 14 to receive the pulsed full-wave rectified power signal $V_{RT}$ and designed to generate counting pulses $V_P$ for the microprocessor-based counting circuit 18. In particular, the RC filter is designed to generate a generally rectangular counting pulse for each full-wave rectified voltage signal in the pulsed full-wave rectified power signal $V_{RT}$. In view of the characteristics of each of full-wave rectified voltage signal, as shown in FIG. 3, a counting pulse represents an ultrasonic sealing cycle of the ultrasonic sealing device 12 and hence will have a time duration TD equal to that of a full-wave rectified voltage signal supplied to the ultrasonic transducer 20, namely equal to or higher than 70-80 msec during ultrasonic sealing, or of about 50 msec during calibration of the ultrasonic sealing device 12.

The microprocessor-based counter 18 includes a microcontroller 23 connected to the stabilized electrical power supply 15 to receive the stabilized supply voltage $V_{ST}$, to the voltage meter 16 to receive the voltage level signal $V_{LEV}$, and to the counting pulse generator 17 to receive the counting pulses $V_P$; a time clock 24 in the form of a piezoelectric crystal (quartz) oscillator connected to the microcontroller 23 to provide the latter with a stable clock signal; a programming connector or port 25 connected to the microcontroller 23 to allow the latter to be programmed by an appropriately programmed external electronic programming device when the ultrasonic sealing device 12 is inoperative; and a reading/writing connector or port 26, such as an RS-232 serial port, connected to the microcontroller 23 to allow the latter to be read/written by an appropriately programmed external electronic reading/writing device when the ultrasonic sealing device 12 is inoperative.

The microcontroller 23 is supplied with electrical power from either the electrical power source 19 of the ultrasonic sealing device 12, when the ultrasonic sealing device 12 is operative, or an external electronic device connected to either the programming port 25 or the reading/writing port 26, when the ultrasonic sealing device 12 is inoperative. In particular, when the ultrasonic sealing device 12 is operative, the pulsed AC voltage signal $V_{US}$ supplied by the electrical power source 12 thereof is first converted by the stabilized power supply 16 into a stabilized supply voltage $V_{ST}$, which is then supplied to an appropriate supply pad of the microcontroller 23.

Moreover, depending on the source of electrical power, the microprocessor 23 is appropriately programmed to operate in three mutually exclusive operating modes:
  in a Counting Mode, when the ultrasonic sealing device 12 is operative and the microcontroller 23 is supplied with electrical power from the electrical power source 19 of the ultrasonic sealing device 12;
  in a Terminal Mode, when the sealing device 12 is inoperative and the microcontroller 23 is supplied with electrical power from the external electronic reading/writing device connected to the reading/writing port 26; and
  in a Programming Mode, when the sealing device 12 is inoperative and the microcontroller 23 is supplied with electrical power from the external electronic programming device connected to the programming port 25.

In the Counting Mode, the microcontroller 23 implements a volatile counter, in the form of a temporary internal register of the microcontroller 23, to count the ultrasonic sealing cycles of the ultrasonic sealing device 12, and, optionally, an additional volatile counter, in the form of a temporary internal register of the microcontroller 23, to count the continuous production cycles of the Filling Machine 1 on which the ultrasonic sealing device 12 is installed.

In particular, as far as the ultrasonic sealing cycle counter is concerned, the microcontroller 23 is programmed to discriminate between ultrasonic sealing cycles and calibration cycles of the ultrasonic sealing device 12, so as to increase the ultrasonic sealing cycle counter when an ultrasonic sealing cycle occurs. To do so, the microcontroller 23 is programmed to:
  distinguish the counting pulses $V_P$ having a time duration TD equal to or higher than 70-80 msec from those having a time duration TD lower than about 50 msec by appropriately determining the time duration TD of each counting pulse supplied thereto. To do so, the time duration TD of each counting pulse $V_P$ is determined and then compared with a time threshold having an intermediate value between the aforementioned time durations TD; and
  increase by one the value in the ultrasonic sealing cycle counter when an ultrasonic sealing cycle is distinguished.

As far as the production cycle counter is concerned, the microcontroller 23 is programmed to determine when a production cycle of the Filling Machine 1 occurs, defined as the time span between the Filling Machine 1 being switched on and off, so as to increase the production cycle counter when a production cycle ends. To do so, the microcontroller 23 is programmed to:
  sense the voltage level signal $V_{LEV}$ supplied by the voltage meter 16 to detect the amplitude of the electrical voltage across the capacitor of the input stage 21 of the stabilized power supply 15 falling below a switching-off supply voltage of the microcontroller 23, this event being indicative of the ultrasonic sealing device 12 being switched off and the production cycle of the Filling Machine 1 being terminated; and
  increase by one the value in the production cycle counter when the voltage level signal $V_{LEV}$ is indicative of the production cycle of the Filling Machine 1 being terminated.

In the end, in order to prevent the values in both the ultrasonic sealing cycle counter and the production cycle counter from being lost when the microcontroller switches off, the microcontroller 23 is further programmed to:
  permanently, unresettably and unerasably store in an internal non-volatile memory, such as an EEPROM, of the microcontroller 23 the values in both the ultrasonic sealing cycle counter and the production cycle counter when the voltage level signal $V_{LEV}$ is indicative of the amplitude of the electrical voltage across the capacitor of the input stage 21 of the stabilized power supply 15 falling below the switching-off supply voltage of the microcontroller 23.

When the ultrasonic sealing device 12 is again operated, the ultrasonic sealing cycle counter and the production cycle counter are again implemented and initialized to the values stored in the internal non-volatile memory of the microcontroller 23.

In the Terminal Mode, data such as the serial number of the electronic counter 10, the amount of the ultrasonic sealing cycles of the ultrasonic sealing device 12 and the amount of the production cycles of the Filling Machine 1, may be read from the internal non-volatile memory of the microcontroller 23 via appropriate reading commands sent by an external electronic reading/writing device. Data, such as the serial number of the electronic counter 10 and, optionally, the serial number of the associated ultrasonic transducer 20, may also be written in the internal non-volatile memory of the microcontroller 23 via appropriate writing commands sent by the external electronic reading/writing device. Other reading/writing commands may also be sent to the microcontroller 23 by the external electronic reading/writing device to read/write other internal registers of the microcontroller 23 for testing/debugging purposes.

In the end, in the Programming Mode the microcontroller 23 is appropriately programmed to operate as previously described.

The advantages that the electronic counter 10 according to the present allows to achieve may be readily appreciated by the skilled person. In particular, the electronic counter 10 allows the operation of an ultrasonic sealing device 12 to be directly and continuously monitored over time, and in particular the amount of ultrasonic sealing cycles performed by the ultrasonic sealing device 12 to be easily, reliably and efficiently determined, so allowing warranty-related issues to be fairly tackled.

The invention claimed is:

1. A packaging machine operable to produce sealed packages made of heat-seal sheet packaging material and containing a food product, the packaging machine comprising an ultrasonic sealing device including an electrical power signal source operable to generate an electrical power signal, and an ultrasonic transducer electrically coupled to the electrical power signal source to receive the electrical power signal and responsively heat seal the sheet packaging material; characterized in that the packaging machine further comprises an electronic counter operable to count ultrasonic sealing cycles of the ultrasonic sealing device and to permanently store the counted ultrasonic sealing cycles of the ultrasonic sealing device.

2. The packaging machine of claim 1, wherein the electronic counter comprises:
a signal processing circuit configured to receive and process the electrical power signal from the electrical power signal source and generate a counting pulse for each ultrasonic sealing cycle of the ultrasonic sealing device; and
a pulse counting circuit electrically coupled to the signal processing circuit to receive and count the counting pulses.

3. The packaging machine of claim 2, wherein the pulse counting circuit is designed to implement:
an ultrasonic sealing cycle counter operable to count the ultrasonic sealing cycles of the ultrasonic sealing device.

4. The packaging machine of claim 3, wherein the pulse counting circuit is further designed to implement:
a production cycle counter operable to count production cycles of the packaging machine.

5. The packaging machine of claim 4, wherein the electronic counter further comprises:
an electrical power supply electrically coupled to the electrical power signal source of the ultrasonic sealing device to receive and convert the electrical power signal into an electrical power for the pulse counting circuit;
a power supply meter electrically coupled to the electrical power supply to supply an electrical power level signal indicative of the electrical power supplied by the electrical power supply;
and wherein the pulse counting circuit comprises:
a microcontroller electrically coupled to the electrical power supply to receive electrical power, to the electrical power supply meter to receive the electrical power level signal, and to the signal processing circuit to receive the counting pulses; a programming port electrically coupled to the microcontroller to allow the latter to be programmed by an external electronic programming device; and a reading/writing port electrically coupled to the microcontroller to allow the latter to be read/written by an external electronic reading/writing device.

6. The packaging machine of claim 5, wherein the microcontroller is programmed to:
distinguish counting pulses corresponding to ultrasonic sealing cycles from counting pulses corresponding to calibration cycles of the ultrasonic sealing device; and
operate the ultrasonic sealing cycle counter when an ultrasonic sealing cycle occurs.

7. The packaging machine of claim 6, wherein the microcontroller is further programmed to:
sense the electrical power level signal to detect the electrical power from the electrical power supply falling below a switching-off electrical power of the microcontroller; and
permanently store the counted ultrasonic sealing cycles of the ultrasonic sealing device when the electrical power level signal is indicative of electrical power from the electrical power supply falling below a switching-off electrical power of the microcontroller.

8. The packaging machine of claim 7, when dependent on claim 4, wherein the microcontroller is further programmed to:
operate the production cycle counter when the electrical power level signal is indicative of electrical power from the electrical power supply falling below a switching-off electrical power of the microcontroller.

9. The packaging machine of claim 8, wherein the microcontroller is further programmed to:
permanently store the counted production cycles of the packaging machine when the electrical power level signal is indicative of electrical power from the electrical power supply falling below a switching-off electrical power of the microcontroller.

10. The packaging machine of claim 3, wherein the pulse counting circuit is designed to be plugged in by an external electronic device, and to be supplied with electrical power from either the electrical power signal source of the ultrasonic sealing device, when the ultrasonic sealing device is operative, or a plugged-in external electronic device, when the ultrasonic sealing device is inoperative.

11. The packaging machine of claim 10, wherein the pulse counting circuit is designed to operate in a Counting Mode, wherein the ultrasonic sealing cycles of the ultrasonic sealing device are counted, when the pulse counting circuit is supplied with electrical power from the power signal source of the ultrasonic sealing device, and in a terminal mode, wherein the counted ultrasonic sealing cycles of the ultrasonic sealing device may be read, when the pulse counting circuit is supplied with electrical power from a plugged-in external electronic reading/writing device.

12. The packaging machine of claim 11, wherein the pulse counting circuit is further designed to operate in a programming mode, wherein the pulse counting circuit may be appropriately programmed, when the pulse counting circuit is supplied with electrical power from a plugged-in external electronic programming device.

13. The packaging machine of claim 2, wherein the electronic counter further comprises:
an electrical power supply electrically coupled to the electrical power signal source of the ultrasonic sealing device to receive and convert the electrical power signal into an electrical power for the pulse counting circuit;
a power supply meter electrically coupled to the electrical power supply to supply an electrical power level signal indicative of the electrical power supplied by the electrical power supply;
and wherein the pulse counting circuit comprises:
a microcontroller electrically coupled to the electrical power supply to receive electrical power, to the electrical power supply meter to receive the electrical power level signal and to the signal processing circuit to receive the counting pulses; a programming port electrically coupled to the microcontroller to allow the latter to be programmed by an external electronic programming device; and a reading/writing port electrically coupled to the microcontroller to allow the latter to be read/written by an external electronic reading/writing device.

14. The packaging machine of claim 1, wherein the electronic counter is arranged in an housing of the ultrasonic transducer.

15. An ultrasonic sealing device for use in a packaging machine operable to produce sealed packages made of heat-seal sheet packaging material and containing a food product, the ultrasonic sealing device comprising an electrical power signal source operable to generate an electrical power signal, an ultrasonic transducer electrically coupled to the electrical power signal source to receive the electrical power signal and responsively heat seal the sheet packaging material, and an electronic counter operable to count ultrasonic sealing cycles of the ultrasonic sealing device and to permanently store the counted ultrasonic sealing cycles of the ultrasonic sealing device.

16. A packaging machine configured to produce sealed packages made of a sealable sheet packaging material and containing a food product, the packaging machine comprising:
an electric power source configured to generate a pulsed alternating current (AC) power signal including a plurality of spaced apart pulses of AC power;
an ultrasonic transducer electrically coupled to the electric power source to receive and convert the pulsed AC power signal into ultrasonic mechanical vibrations to heat seal the sheet packaging material; and
an electronic counter electrically coupled to the electric power source and configured to count the pulses of AC power in the pulsed AC power signal and to permanently store the counted pulses of AC power of the electric power source.

17. The packaging machine of claim 16, wherein the electronic counter is configured to convert the pulsed AC power signal into pulses of constant magnitude, and count the pulses of constant magnitude to determine the number of pulses of AC power in the pulsed AC power signal.

18. An electronic counter for use in an ultrasonic sealing device having an electric power source configured to generate a pulsed alternating current (AC) power signal including a plurality of spaced apart pulses of AC power and an ultrasonic transducer electrically coupled to the electric power source to receive and convert the pulsed AC power signal into ultrasonic mechanical vibrations, wherein the electronic counter is configured to be electrically coupled to the electric power source and to count the pulses of AC power in the pulsed AC power signal, thereby counting ultrasonic sealing cycles of the ultrasonic sealing device, and to permanently store the counted ultrasonic sealing cycles of the ultrasonic sealing device.

* * * * *